United States Patent
Webber

(10) Patent No.: US 8,209,520 B2
(45) Date of Patent: Jun. 26, 2012

(54) EXPANDED FUNCTIONALITY OF PROCESSOR OPERATIONS WITHIN A FIXED WIDTH INSTRUCTION ENCODING

(75) Inventor: Andrew Webber, Herts (GB)

(73) Assignee: Imagination Technologies Limited, Kings Langley, Hertfordshire (GB)

( * ) Notice: Subject to any disclaimer, the term of this patent is extended or adjusted under 35 U.S.C. 154(b) by 128 days.

(21) Appl. No.: 11/725,631

(22) Filed: Mar. 20, 2007

(65) Prior Publication Data

US 2007/0288723 A1 Dec. 13, 2007

Related U.S. Application Data

(63) Continuation of application No. 10/311,264, filed on Jun. 12, 2003, now abandoned.

(51) Int. Cl.
*G06F 7/38* (2006.01)
*G06F 9/00* (2006.01)
*G06F 9/44* (2006.01)

(52) U.S. Cl. .................... 712/220; 712/207; 712/248

(58) Field of Classification Search .................... 712/220
See application file for complete search history.

(56) References Cited

U.S. PATENT DOCUMENTS

| | | |
|---|---|---|
| 4,446,518 A | 5/1984 | Casamatta |
| 5,574,927 A | 11/1996 | Scantlin |
| 5,592,635 A | 1/1997 | Chan |
| 5,734,854 A | 3/1998 | Chan |
| 5,828,875 A | 10/1998 | Halvarsson et al. |
| 5,848,255 A | 12/1998 | Kondo |
| 5,922,065 A | 7/1999 | Hull et al. |
| 6,075,937 A | 6/2000 | Scalzi et al. |
| 6,081,888 A * | 6/2000 | Bell et al. ............. 712/248 |
| 6,292,881 B1 | 9/2001 | Tanaka et al. |
| 6,324,629 B1 | 11/2001 | Kulkarni et al. |
| 6,643,800 B1 * | 11/2003 | Safford et al. .......... 714/35 |

FOREIGN PATENT DOCUMENTS

| | | |
|---|---|---|
| JP | 1-276233 A | 11/1989 |
| JP | 11259290 | 9/1999 |

OTHER PUBLICATIONS

Linley Gwennap, Intel's P6 Uses Decoupled Superscalar Design: Next Generation of x86 Integrates L2 Cache in Package with CPU, Feb. 1995.*
Stallings, Computer Organization and Architecture, 1996.*

* cited by examiner

*Primary Examiner* — Chun-Kuan Lee
*Assistant Examiner* — Jesse R Moll
(74) *Attorney, Agent, or Firm* — Flynn, Thiel, Boutell & Tanis, P.C.

(57) ABSTRACT

An apparatus for executing fixed width instructions in a multiple execution unit system has a device for fetching instructions from a memory, and a decoder for decoding each fetched instruction in turn. A determination is made as to whether each decoded instruction includes a portion to fetch a locally stored instruction from a local store. If it does, the locally stored instruction is fetched and locally stored portion are executed.

20 Claims, 4 Drawing Sheets

BASE ARCHITECTURE

REGULAR INSTRUCTION:

| REGISTER SELECTOR | REGISTER SELECTOR | REGISTER SELECTOR | FUNCTION SELECTOR | 0 | (SPARE) |

TEMPLATE DEFINING INSTRUCTION:

| MEMORY OPERATION FUNCTION SELECTOR | TEMPLATE SELECTOR | FUNCTION SELECTOR | 1 | (SPARE) |

| REGISTER SELECTOR | REGISTER SELECTOR | REGISTER SELECTOR | TEMPLATE FUNCTION | (SPARE) |

EXPANDED FUNCTIONALITY OF PROCESSOR OPERATIONS WITHIN A FIXED WIDTH INSTRUCTION ENCODING

This application is a continuation of U.S. Ser. No. 10/311,264, filed Jun. 12, 2003 now abandoned.

FIELD OF THE INVENTION

This invention relates to instruction encoding of the fixed width type and is of particular benefit in processing systems which include multiple execution units or pipelines.

BACKGROUND OF THE INVENTION

In almost all forms of processing unit, e.g. central processing units or digital signal processors, instructions that control the operations of the system have a fixed size limit, often known as the instructions width. This limit imposes a restriction on how much each instruction can describe. In particular, processing systems which have multiple execution units or pipelines may be unable to usefully specify activity within all of those execution units or pipelines within the fixed width constraint of the instruction. This means that the full processing power of the system cannot always be fully utilized. One option would be to increase the width of the instructions size, for example by using very long instruction words. This, however, would slow down the instructions fetch and decoding process and would require wider parallel buses to transport the instructions.

SUMMARY OF THE INVENTION

Preferred embodiments of the invention can be used with systems such as that described in our international patent application number WO97/38372, the contents of which are herein incorporated by reference. This document discloses a processing system which manages the processing of a number of different processing instructions threads by one or more data processors.

Preferred embodiments of the present invention seek to overcome the problems associated with these existing systems by use of a locally stored or template instruction. These are usually the functional parts of an instruction which are stored separately and can then be invoked for particular processing units with a single regular instruction. This allows multiple compatible instructions to be invoked with a single instruction issued within the fixed width size limit of the system. The single instruction which is used to invoke the template instruction can be issued with variable parameters, thereby retaining much of the variability of purpose that the many individual instructions which would otherwise have been required would have had. For example the template instruction may be to read data from memory and to enter it into the memory register of a processing unit. The memory read operation would be stored in a template instruction along with the function instructing it to write the read data to the register of a processing unit. The single instruction which invokes the template would specify the template to be accessed and the registers to be used by that template function. Thus, the relevant data from memory will be read and written into the registers specified in the invocation instruction. Thus, the invocation instruction only needs to include the template invocation function and the registers required rather than having to specify the memory read instruction for each register. Thus, the reading of data from memory into a number of registers associated with individual processing units can be accomplished using fewer fixed width instructions than would otherwise have been the case.

BRIEF DESCRIPTION OF THE DRAWINGS

A preferred embodiment of the invention will now be described in detail by way of example with reference to the accompanying figures in which.

DETAILED DESCRIPTION

Figure 1:
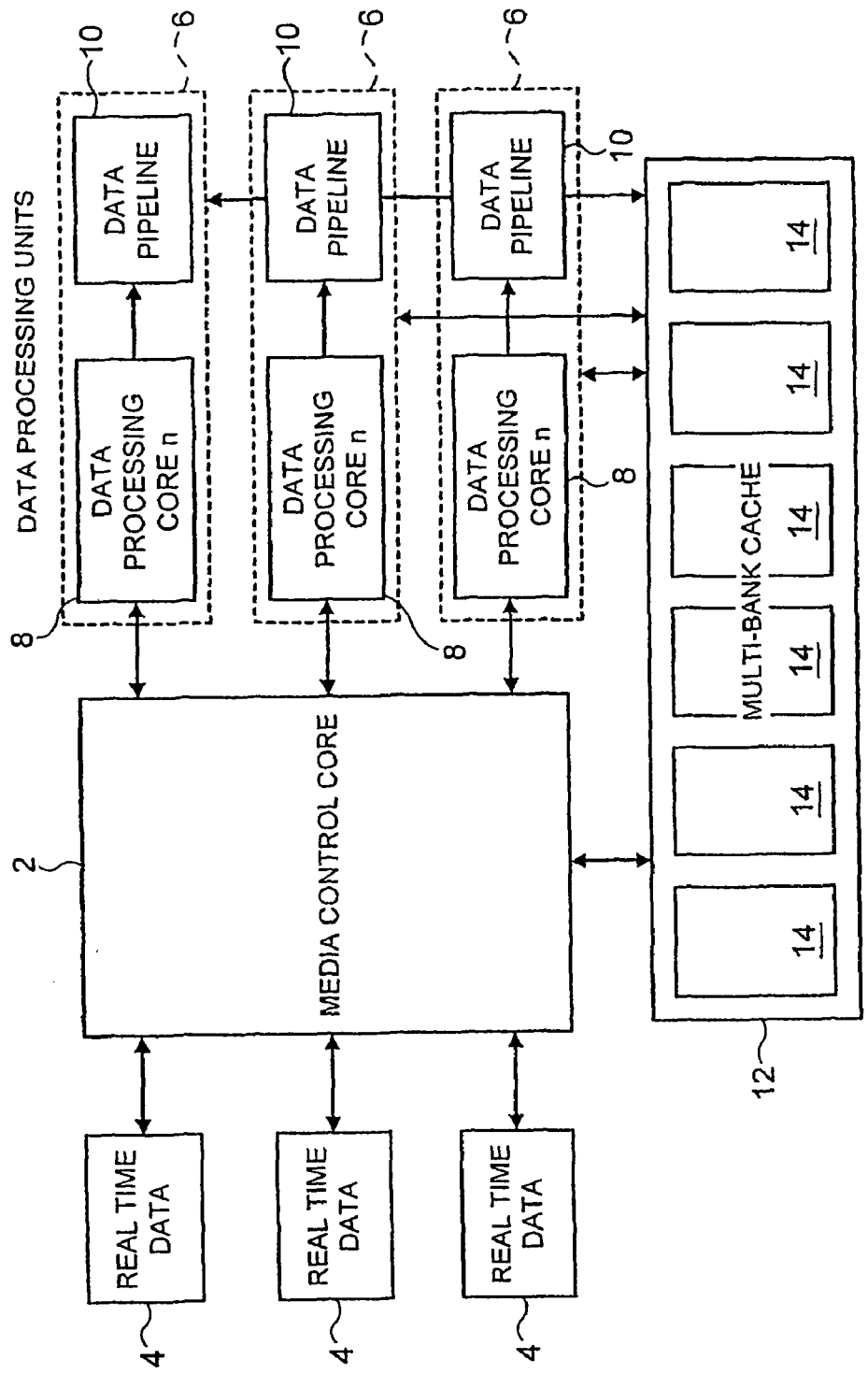
FIG. 1 is a block diagram of the base architecture of a multithreaded multiprocessor system of the type in which an embodiment of the invention may be used.

In the block diagram of FIG. 1, the central part of the system is the media control core (MCC) 2 which comprises a fine grained multithreaded multiprocessor. It has a plurality of inputs and outputs which can be coupled to real time data input and output devices 4 which may be for example, video sources, audio sources, video outputs, audio outputs, data sources, storage devices, etc. In the most simple example only a single input and a single output are provided. Also coupled to the MCC 2 are a plurality of data processing unit 6. Each of these comprises a data processing core 8 which controls the processing of data by a data pipeline 10. The core 8 decodes the sequences of micro instructions for the pipeline 10 after these have been provided to the instructions scheduler in the MCC 2.

Also coupled to the MCC 2 is a multibank cache memory 12 from which data may be retrieved by the MCC 2 and data processing unit 6 and into which data may be written by the MCC 2 and the data processing unit 6. It includes temporary storage for data and instructions to be performed by the data processing cores on the input data and other internally generated data. These various sets of instructions will, when activated, comprise processing threads.

Figure 2:
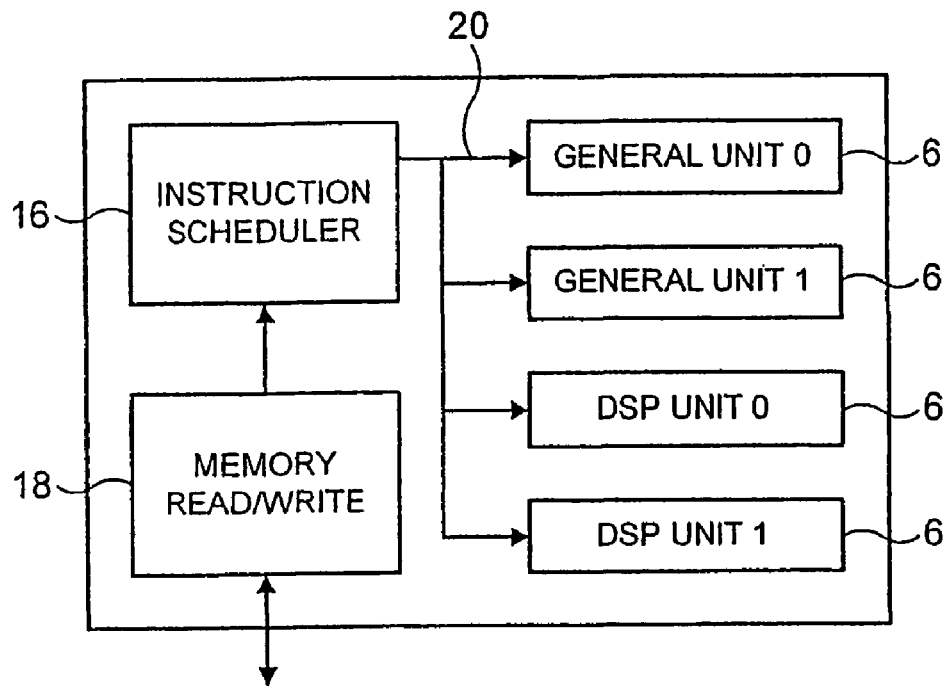
FIG. 2 shows schematically the instruction scheduler and memory read/write controller of the media control core of FIG. 1.

A portion of the internal architecture of the media control core 2 is shown in FIG. 2. This comprises an instruction scheduler 16 and a memory read write unit 18. Instructions are provided to the scheduler by the memory read/write unit. These instructions have a fixed width of Nbits as will be discussed below with reference to FIG. 3. The instruction scheduler sends instructions to data processing unit 6. In this example, the data processing units illustrated are two general data processing units and two digital signal processing units. Because of the multithreaded nature of the processor, the instruction set incorporates instructions that may usefully utilise several execution units at once, for example, both DSP units may be used at the same time. Instructions for the processing units 6 are carried via an instruction bus 20.

Figure 3:
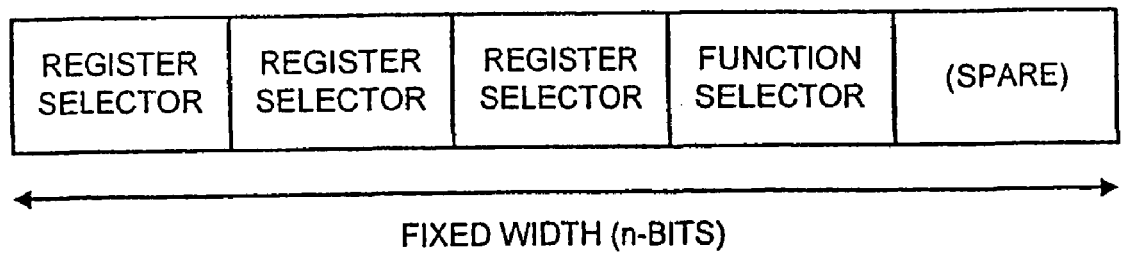
FIG. 3 shows a standard fixed width instruction of the type which could be scheduled by the apparatus of FIG. 2.

In FIG. 3 it can be seen that in this example, each instruction supplied to the instruction scheduler has the same fixed width with the bits of the instruction being subdivided into operational code (opcode) fields in a number of ways. These opcode fields typically select the functionality of the instruction, or the registers housed within data processing cores 8, to which that function is to be applied. Thus, in FIG. 3, the instruction specifies three registers, which will typically reside in each of three separate processing units 6, and a single function which is to be applied to all of those registers. In the example given, some of the bits of the instructions bits are marked as spare. This will not always be the case but it is in many cases preferable to have spare bits allocated so that other functions may be selected.

It will be appreciated that if additional processing units are used, it may not be possible to provide instructions for all of these simultaneously, thereby leading to less than the maximum processing power being used.

Figures 4, 5, 6:
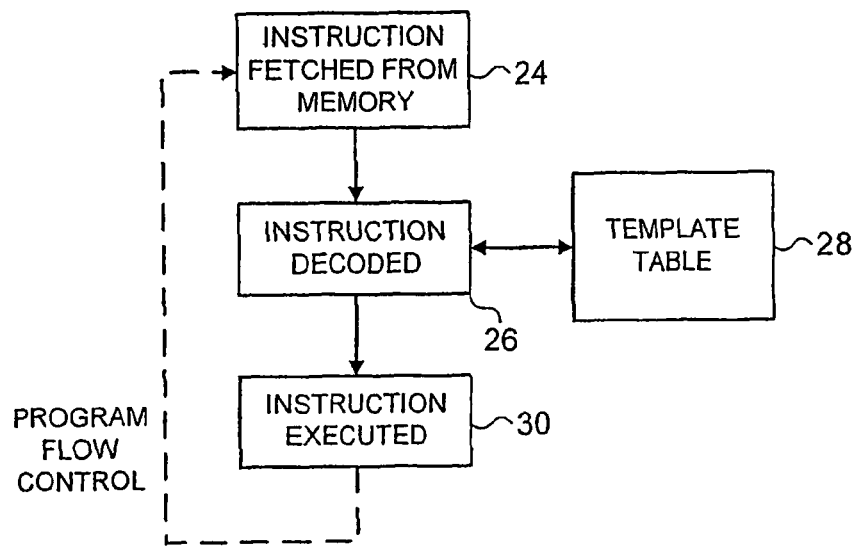
FIG. 4 shows the flow of control in template instruction scheduling.
FIG. 5 shows a regular instruction of the type shown in FIG. 1 with a template selection bit and also a template defining instruction which also includes a template defining bit.
FIG. 6 shows a flow diagram of the flow of control in an embodiment of the invention.

Accordingly, we have appreciated that the instruction bandwidth can be increased using the same fixed width instruction bus and clock frequency by use of what are known as template instructions. These are locally stored instructions which specify the nature of all the elements of an operation to be performed, e.g. a memory operation, without specifying the memory locations to be addressed or the registers to be accessed in that memory operation. Instructions are stored in a template table and the basic block diagram of how this is arranged within the instruction scheduler is shown in FIG. 4. This flow diagram illustrates at 24, an instruction fetch from memory. At 26, the instruction is decoded and if the decoder detects that it is an instruction which invokes a template instruction, a template instruction is read from a template table 28. Instructions are then executed at 30 and program flow returns to the instruction fetch block 24.

The template instructions are now described in more detail with reference to FIGS. 5A and B. 5A shows a regular instruction which comprises 3 register selections and a function selector. One of the bits of the spare bits is set as a 0 and this particular bit is recognised by the instruction decoder as defining this as a regular instruction.

In FIG. 5B, a template defining instruction is shown. This is an instruction which is sent to store a template instruction in the template table 28. The bit that was set as 0 in the regular instruction is now set as a 1 and the instruction decoder recognises this as a template defining instruction and sends data to the template table 28. The template defining instruction in this example comprises a memory operation function selector. This defines whether the operation is a memory read or write and, the size of transfer, and address generation information. The address generation will usually be of the form base register and offset register, or base register and immediate number (a small number defined with the instruction as opposed to one coming from a register). The memory operation may also specify which processing unit is to be used. The memory address generation will then be performed by that execution unit. The template selector defines the location in the template table 28 to which the template instruction will be written. The function selector selects the function to be used in the execution unit(s) when the template instruction is invoked by a template invocation instruction. This could be "add", "multiply", "shift" etc. Thus, all the elements of the memory operation are specified in the template definition in place of bits which would be used in a regular instruction.

A template invocation instruction is shown in FIG. 6. This has essentially the same form as the regular instruction shown in FIG. 5. However, in this case the instruction's function is to invoke the function specified by a given template in relation to e.g. the registers specified in the template invocation instruction. Thus, at the instruction decode step 26 in FIG. 4, the template select function from the instruction of FIG. 6 will be recognized. This will specify the particular template to be invoked. In the case of the example of FIG. 5B, if this template is invoked, this causes the memory operation specified to be performed and the function specified to be performed with the relevant data on the registers specified in the invocation instruction. If this was a memory read operation it accesses memory as defined by the function selector of FIG. 5B and writes data of the appropriate size to the registers specified in the instruction of FIG. 6.

Figure 7:
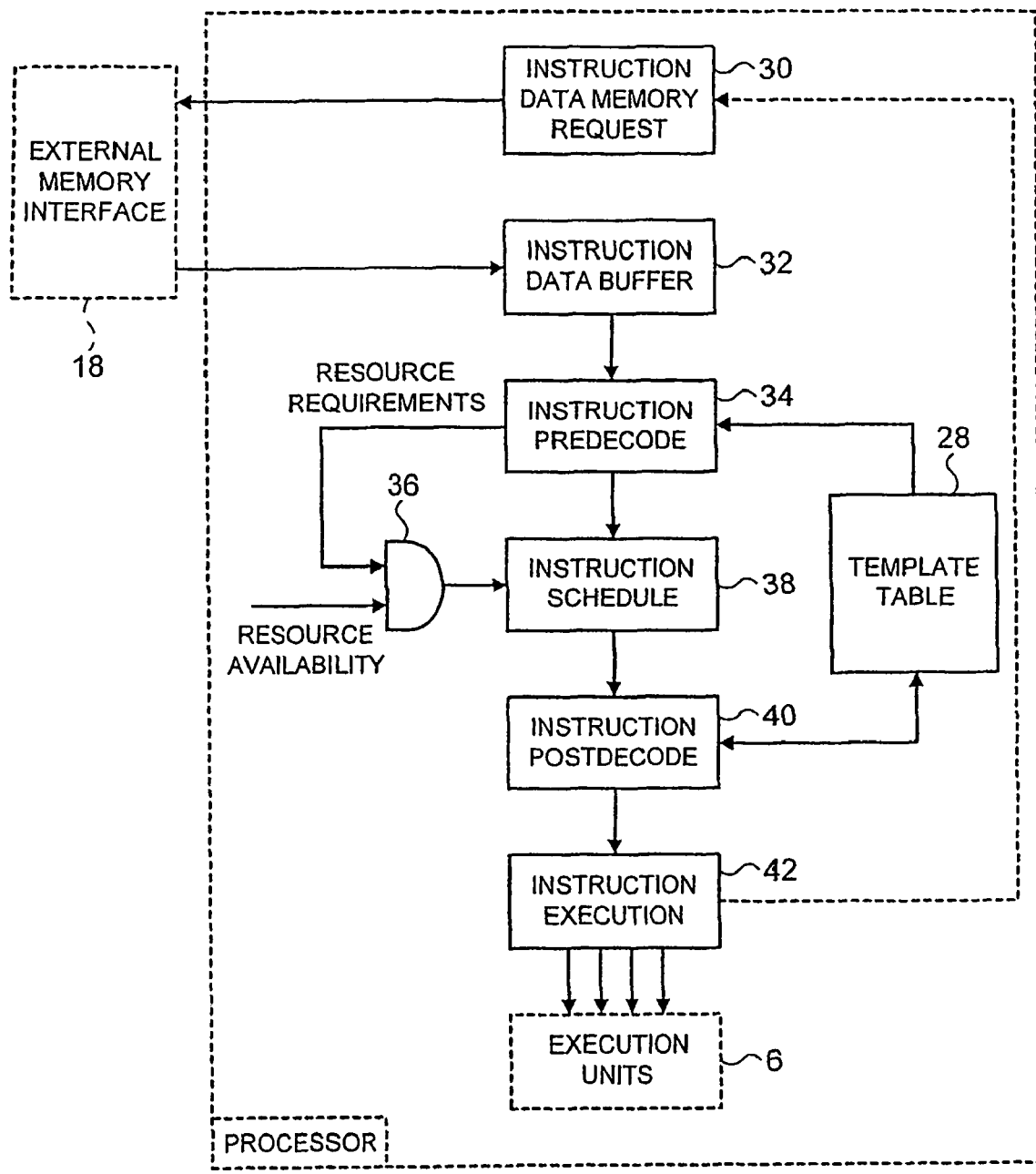
FIG. 7 is a block hardware diagram of the instruction scheduler of FIG. 2.

A more detailed design of the circuits to be included in the instructions scheduler to implement all of this is shown in FIG. 7. This comprises an interface with the memory read/write unit 18 of FIG. 2. In response to instruction data memory request unit 30, this provides instructions to an instruction data buffer 32. These are then passed in turn to an instruction predecode unit 34. This provides at an output the resource requirements for that instruction which are then supplied to an AND gate 36 whose other input unit is resource availability. If availability matches requirements then the output of the AND gate enables an instruction schedule unit 38 which passes the instructions to an instruction postdecode unit 40 where they are arranged for passing to instruction execution unit 42 and thus to execution units 6.

A template table 28 communicates with the instruction predecode unit 34 and the instruction postdecode unit 40. When a template invocation instruction of the type shown in FIG. 6 is detected at the instruction predecode unit, this will pass to instruction schedule unit 38 and instruction postdecode unit 40. This will recognise the instruction at a template invocation instruction and using the template select function from the instruction of FIG. 6 will send a read signal to the template table 28, to select the appropriate template instruction. This is then sent to instruction predecode unit 34, and passes through as previously described with resource requirements being matched to availability and the instruction from the template being passed through to instruction execution at 42 via the instruction postdecode unit 40 which has retained the register selectors specified in the template invocation instruction. Preferably the template instruction is provided to both predecode and postdecode units with the predecode then checking resource availability and enabling the scheduler to send data to the postdecode unit to start execution of the function from the template with the registers specified in the invocation instruction When the instruction received is a template defining instruction, and the appropriate one of the spare bits is set to 1, this is recognised by the instruction predecode and postdecode unit and the template instruction is read into a portion of the template table defined by the template selector of FIG. 5B from the instruction post decode unit 40. Any further execution takes place at that stage.

After the instruction execution unit 42 has sent data to the execution unit 6 the flow of program control returns to the instruction data memory request unit 30 and execution continues.

Because of the use of template defining instructions it will be appreciated that the template table can change during execution of any particular program. Thus, a trade off can be achieved between the size of the template table and the speed of processing. A large template table is able to store all the possible types of operation which might be required and would not need to be updated. However, if a smaller template table is used, each program that runs on it might start by first defining a set of template instructions which it will use and writing these into a template table. The program can then execute with appropriate access to the template instructions being made as required. In such a situation, the contents of the template table can be dynamically altered during execution of the program by sending further template defining instructions as these are required when the program passes to a different stage of execution.

The use of the template instructions thus enables instructions which could not be invoked using a fixed width instruction bus to be invoked, simultaneously, thereby improving the processing speed of the unit and making better use of processing resources, and without using very long instruction words.

What is claimed is:

1. A multiple parallel execution unit system for executing instructions comprising:
   means for fetching fixed width instructions from a memory, each of the fixed width instructions comprising a portion for fetching a template instruction and a portion for containing variable parameters relating to the template instruction;
   means for pre-decoding each of the fetched instructions in turn;
   means for determining whether each of the pre-decoded instructions includes a portion for fetching a locally stored template instruction from local storage means;
   means for fetching the locally stored template instruction;
   means for opening and decoding the fetched locally stored template instruction; and
   means for causing the decoded fetched locally stored template instruction to be executed using the variable parameters included in the fixed width instruction.

2. The system according to claim 1 further including means for storing additional local template instructions in the local storage means in response to data included in the fetched instruction.

3. The system according to claim 2, wherein the data included in the fetched instruction includes data defining a location in the local storage means into which the additional local template instruction is to be written.

4. The system according to claim 2, wherein the means for storing the additional local template instructions is operable during an execution of a program whereby contents of the locally stored template instructions may be dynamically altered during the execution of the program.

5. The system according to claim 1, wherein the locally stored template instruction comprises at least a functional portion defining a type of an operation to be performed.

6. The system according to claim 1, wherein the pre-decoding means provides an output defining resource requirements for the instruction fetching means in comparison with resource availability and means for enabling the scheduling means in dependence on a result of the comparison.

7. The system according to claim 1, wherein the fetched locally stored template instruction can operate on a plurality of different processors.

8. A method for executing instructions in a multiple parallel execution unit system, the method comprising the steps of:
   fetching fixed width instructions from a memory, each of the fixed width instructions comprising a portion for fetching a template instruction and a portion for containing variable parameters relating to the template instruction;
   pre-decoding each of the fetched instructions in turn;
   determining whether each of the pre-decoded instructions includes a portion for fetching a locally stored template instruction from local storage means;
   fetching the locally stored template instruction;
   opening and decoding the fetched locally stored template instruction; and
   causing the decoded fetched locally stored template instruction to be executed using the variable parameters included in the fixed width instruction.

9. The method according to claim 8 further including the step of storing additional local template instructions in response to data included in the fetched instruction.

10. The method according to claim 9, wherein the data included in the fetched instruction includes data defining a location in local storage means into which the additional local template instruction is to be stored.

11. The method according to claim 9, wherein the step of storing the additional local template instructions in response to the data in the fetched instruction is operable during an execution of a program whereby contents of the locally stored template instructions may be dynamically altered during the execution of the program.

12. The method according to claim 8, wherein the locally stored template instruction comprises at least a functional portion defining a type of an operation to be performed.

13. The method according to claim 8, wherein the fetched locally stored template instruction can operate on a plurality of different processors.

14. The method according to claim 8 further including the steps of checking the resource requirements against the resource availability and enabling the scheduling means in dependence on a result of the checking step.

15. A multiple parallel execution unit system comprising:
    multiple parallel execution units, each of the execution units being configured to perform a function independently and simultaneously with the other execution units and comprising a data processing core;
    a control core for receiving fixed width instructions and outputting the fixed width instructions to the multiple parallel execution units, each of the fixed width instructions comprising a portion for retrieving a template instruction and a portion for containing variable parameters relating to the template instruction;
    a memory for receiving data written by the control core and the multiple parallel execution units and containing data to be retrieved by the control core and the multiple parallel execution units;
    means for pre-decoding the data retrieved by the control core from the memory in turn;
    means for determining whether the pre-decoded data includes a portion for retrieving a locally stored template instruction from local storage means;
    means for retrieving the locally stored template instruction;
    means for opening and decoding the retrieved locally stored template instruction; and
    means for sending the decoded retrieved locally stored template instruction to be executed using the variable parameters included in the fixed width instruction.

16. The system of claim 15, wherein a sum of widths of the instructions from the control core to the multiple parallel execution units is greater than the fixed width instruction.

17. The system according to claim 15, wherein the retrieved locally stored template instruction can operate on a plurality of different processors.

18. A method for executing instructions in a multiple parallel execution unit system, the method comprising the steps of:
    providing multiple parallel execution units, each of the execution units being configured to perform a function independently and simultaneously with the other execution units and comprising a data processing core;

receiving fixed width instructions by a control core, each of the fixed width instructions comprising a portion for retrieving a template instruction and a portion for containing variable parameters relating to the template instruction;

outputting the fixed width instructions to the multiple parallel execution units by the control core;

receiving data written by the control core and the multiple parallel execution units to a memory;

containing the data to be retrieved by the control core and the multiple parallel execution units to the memory;

pre-decoding the data retrieved by the control core from the memory in turn;

determining whether the pre-decoded data includes a portion for retrieving a locally stored template instruction from local storage means;

retrieving the locally stored template instruction;

opening and decoding the retrieved locally stored template instruction; and sending the decoded retrieved locally stored template instruction to be executed using the variable parameters included in the fixed width instruction.

19. The method of claim 18, wherein a sum of widths of the instructions from the control core to the multiple parallel execution units is greater than the fixed width instruction.

20. The method according to claim 18, wherein the retrieved locally stored template instruction can operate on a plurality of different processors.

* * * * *

UNITED STATES PATENT AND TRADEMARK OFFICE
CERTIFICATE OF CORRECTION

| | | |
|---|---|---|
| PATENT NO. | : 8,209,520 B2 | Page 1 of 1 |
| APPLICATION NO. | : 11/725631 | |
| DATED | : June 26, 2012 | |
| INVENTOR(S) | : Andrew Webber | |

It is certified that error appears in the above-identified patent and that said Letters Patent is hereby corrected as shown below:

On the title page, after (21) Appl. No.: 11/725 631,
change "(22) Filed: Mar. 20, 2007"

to -- (22) PCT Filed: Apr. 23, 2002

(86)     PCT No.:     PCT/GB2002/001883

§371 (c) (1),
         (2), (4) Date:     Mar. 20, 2007

(87)     PCT Pub. No.:     WO2002/086701
         PCT Pub Date: Oct. 31, 2002 --

Below (63) insert:

-- (30)     Foreign Application Priority Data
         Apr. 23, 2001     (GB)     0109939.9 --

Signed and Sealed this
Twenty-third Day of October, 2012

David J. Kappos
*Director of the United States Patent and Trademark Office*